(12) United States Patent
McNaughton et al.

(10) Patent No.: US 11,853,906 B1
(45) Date of Patent: Dec. 26, 2023

(54) METHODS FOR DEVELOPMENT OF A MACHINE LEARNING SYSTEM THROUGH LAYERED GRADIENT BOOSTING

(71) Applicant: Towers Watson Software Limited, Reigate (GB)

(72) Inventors: Rachael McNaughton, Reigate (GB); Richard Bland, Reigate (GB); Colin Towers, Reigate (GB); William James, Reigate (GB)

(73) Assignee: Towers Watson Software Limited, Reigate (GB)

( * ) Notice: Subject to any disclaimer, the term of this patent is extended or adjusted under 35 U.S.C. 154(b) by 0 days.

(21) Appl. No.: 18/301,660

(22) Filed: Apr. 17, 2023

Related U.S. Application Data

(60) Provisional application No. 63/356,006, filed on Jun. 27, 2022.

(51) Int. Cl.
*G06N 5/02* (2023.01)
*G06N 5/022* (2023.01)
*G06Q 40/08* (2012.01)
*G06N 5/01* (2023.01)

(52) U.S. Cl.
CPC .............. *G06N 5/022* (2013.01); *G06N 5/01* (2023.01); *G06Q 40/08* (2013.01)

(58) Field of Classification Search
None
See application file for complete search history.

(56) References Cited

U.S. PATENT DOCUMENTS

| | | | |
|---|---|---|---|
| 10,977,737 B2 | 4/2021 | Ironside | |
| 10,990,878 B2 | 4/2021 | Olabiyi et al. | |
| 11,514,526 B1 | 11/2022 | Kwarther et al. | |
| 11,562,224 B2 | 1/2023 | Wu et al. | |
| 2019/0311275 A1 | 10/2019 | Huang et al. | |
| 2022/0083906 A1* | 3/2022 | Ong | G06F 18/254 |
| 2022/0164877 A1* | 5/2022 | Kamkar | G06N 20/00 |

OTHER PUBLICATIONS

Wen et al., Efficient Gradient Boosted Decision Tree Training on GPUs, 2018 IEEE International Parallel and Distributed Processing Symposium, pp. 234-243 (Year: 2018).*

Feng, Ji et al., "Multi-Layered Gradient Boosting Decision Trees," 32nd Conference on Neural Information Processing Systems (NeurIPS 2018), Montréal, Canada.

* cited by examiner

*Primary Examiner* — Alan Chen
(74) *Attorney, Agent, or Firm* — King & Spalding

(57) ABSTRACT

A layered machine learning system for processing data. The machine learning system comprises decision trees with different depths. An iterative training process is performed on the layered machine learning system to determine the structures of the decision trees based on prior predictions. The fitted decision trees are further configured to update leaf values with a gradient boosting method. By cumulating the predictions of decisions trees in prior iterations, interaction effects are modeled among different depths within the layered machine learning system.

23 Claims, 9 Drawing Sheets

900

---

Algorithm 1 Layered Gradient Boosting Machine (LGBM) Algorithm

Inputs:
Training dataset $\{x_i, y_i\} \in R$, weight variables $\omega_i$, and starting predicted values $\xi_i^{(0,0)}$ for $i = 1, \ldots, N$.

Initializations:
Select a set of hyperparameters $\mathcal{H}$ including learning rate $\lambda$, maximum depth $D$, number of rounds $R$, minimum split loss, minimum child weight, etc.
Select a loss function $\mathcal{L}$ from one of the distributions: Normal, Poisson, Gamma, Tweedie, and Logistic.

Output: A trained LGBM model.

1:  for Hyperparameters $\mathcal{H}$ do
2:    for depth of a decision tree $d = 1, 2, \ldots, D$ do
3:      for round $r = 1, 2, \ldots, R$ do
4:        if round $r = 1$ then
5:          Build a depth-$d$ decision tree $\mathcal{T}_d$ with $\xi_i^{(0,0)}$
6:        else
7:          Build a depth-$d$ decision tree $\mathcal{T}_d$ with cumulative $\xi_i^{(t,l)}$
8:          wherein $t = 0, \ldots, r-1$ and $l = 1, \ldots, d$
9:        end if
10:       Keep splits of $\mathcal{T}_d$
11:       Calculate $\mathcal{L}'$ and $\mathcal{L}''$
12:       Calculate marginal update $p_i = -\frac{\mathcal{L}'}{\mathcal{L}''}$
13:       Update predicted values of $\mathcal{T}_d$: $\xi_i^{(r,d)} = \xi_i^{(r-1,d)} + \lambda p_i$ based on predicted values of decision trees in lower depths of all rounds and decision trees of equal depth in prior rounds.
14:       if any of early stopping criteria is met then
15:         Set $d = d + 1$
16:         Move to next depth of decision tree
17:       else
18:         Set $r = r + 1$
19:         Move to next round of training process
20:       end if
21:     end for
22:   end for
23:   Tune Hyperparameters $\mathcal{H}$ wrt. $\lambda$, $D$, $R$, minimum split loss, minimum child weight, etc.
24: end for

Algorithm 1 Layered Gradient Boosting Machine (LGBM) Algorithm

Inputs:
Training dataset $\{x_i, y_i\} \in R$, weight variables $\omega_i$, and starting predicted values $\xi_i^{(0,0)}$ for $i = 1, \ldots, N$.

Initializations:
Select a set of hyperparameters $\mathcal{H}$ including learning rate $\lambda$, maximum depth $D$, number of rounds $R$, minimum split loss, minimum child weight, etc.
Select a loss function $\mathcal{L}$ from one of the distributions: Normal, Poisson, Gamma, Tweedie, and Logistic.

Output: A trained LGBM model.

1: for Hyperparameters $\mathcal{H}$ do
2:    for depth of a decision tree $d = 1, 2, \ldots, D$ do
3:       for round $r = 1, 2, \ldots, R$ do
4:          if round $r = 1$ then
5:             Build a depth-$d$ decision tree $\mathcal{T}_d$ with $\xi_i^{(0,0)}$
6:          else
7:             Build a depth-$d$ decision tree $\mathcal{T}_d$ with cumulative $\xi_i^{(t,l)}$
8:             wherein $t = 0, \ldots, r - 1$ and $l = 1, \ldots, d$
9:          end if
10:         Keep splits of $\mathcal{T}_d$
11:         Calculate $\mathcal{L}'$ and $\mathcal{L}''$
12:         Calculate marginal update $p_i = -\frac{\mathcal{L}'}{\mathcal{L}''}$
13:         Update predicted values of $\mathcal{T}_d$: $\xi_i^{(r,d)} = \xi_i^{(r-1,d)} + \lambda p_i$ based on predicted values of decision trees in lower depths of all rounds and decision trees of equal depth in prior rounds.
14:         if any of early stopping criteria is met then
15:             Set $d = d + 1$
16:             Move to next depth of decision tree
17:         else
18:             Set $r = r + 1$
19:             Move to next round of training process
20:         end if
21:       end for
22:    end for
23:    Tune Hyperparameters $\mathcal{H}$ wrt. $\lambda$, $D$, $R$, minimum split loss, minimum child weight, etc.
24: end for

FIG. 9

METHODS FOR DEVELOPMENT OF A MACHINE LEARNING SYSTEM THROUGH LAYERED GRADIENT BOOSTING

CROSS-REFERENCE TO RELATED APPLICATIONS

The present application claims priority under 35 U.S.C. § 119 to U.S. Provisional Application No. 63/356,006, entitled "Methods for Development of a Machine Learning System", filed on Jun. 27, 2022, the entirety of which is incorporated by reference herein.

TECHNICAL FIELD

The present invention generally relates to a machine learning system. More particularly, the invention relates to a machine learning system for use in the development of insurance premium rating structures and pricing applications.

BACKGROUND OF THE INVENTION

The use of machine learning within the insurance sector has exploded over the last ten years, with most insurers now implementing some form of machine learning within their organization. Machine learning provides an improvement in predictive power within many areas of an organization, improving efficiencies and effectiveness of spend.

Machine learning models, such as gradient boosting machines, can produce highly predictive models but often do so at the cost of transparency. A typical machine learning model can contain many millions of computations to provide inferences for a single data point or transaction. These computations cannot be easily summarized, and so alternative methods are used to understand the broad interpretations of such models.

Historically, insurance premium rating structures have been developed as a series of multiplicative calculations, combined with a small set of constraining calculations or modifiers. Each of these multiplicative calculations depends upon a single characteristic of the insurance risk, or alternatively, a small number of such characteristics.

Across the world, there is a strong desire to use machine learning techniques in the field of insurance premium rating for a more accurate assessment of risk. The requirement to produce a transparent algorithm to meet the desires of stakeholders and, especially, regulators for a fair treatment of customers prevents the direct use of such techniques. Existing methods to achieve transparency do so at a significant reduction in efficacy.

Gradient boosting is a machine learning technique used in regression and classification tasks. It builds decision trees sequentially on all the features of a dataset. Specifically, in each round or iteration, the strongest one-way effect is selected to determine the branch or split of a decision tree. The dataset is then segmented into two subsets, and the splits at depth-2 will be the strongest effect within each subset. From a linear modelling perspective, we do not know if the split at depth-2 is guided by a strong one-way effect still present in the data, or an interaction effect only seen within that segment of data. To solve the issue of the interpretation of effects within a decision tree, there is a need to design and build a model that retains the advantages of the gradient boosting (robust model building through boosting) while identifying any interaction effects separately from independent one-way effects or lower-level interaction effects.

SUMMARY OF THE INVENTION

Embodiments generally provide a system and method for generating predictions of insurance premium policies, claim cost, claim frequency, and claim severity, based on customer input data. The system comprises at least one processor, at least one memory, and at least one database storing a training dataset comprising a plurality of records, wherein each of the plurality of records includes one or more attribute variables associated with historical customer data and a response variable representing a known insurance premium outcome.

The memory stores instructions that, when executed by the at least one processor, cause the at least one processor to retrieve the training dataset from the at least one database; convert the plurality of records in the training dataset to categorical variables in numeric representation; select a first set of numerical parameters and a second set of numerical parameters; select a loss function based on a probability distribution; initialize a model having a plurality of decision trees with different depths, based on the training dataset, the first set of numerical parameters, the second set of numerical parameters, the selected loss function, and a third set of numerical parameters, to compute a plurality of model parameters; and train the model, based on the training dataset, to refine a plurality of model parameters of the plurality of decision trees through a plurality of iterations.

In each iteration, the instructions cause the at least one process to compute a first-order derivative and a second-order derivative of the select loss function based on the training dataset, the first set of numerical parameters, and a first set of model parameters of decision trees in equal or lower depths in prior iterations; determine splits of the plurality of decision trees based on comparison results between the second-order derivative of the selected loss function and a first element of the second set of numerical parameters; compute a marginal parameter based on the ratio of the computed first-order derivative and the computed second-order derivative of the selected loss function; update the model parameters of the plurality of decision trees with a product of the marginal parameter and a second element of the second set of numerical parameters based on a second set of model parameters of decision trees in lower depths of all iterations and in the equal depth in prior iterations; determine that the trained model, after training through the plurality of iterations, satisfies at least one of stopping criteria; and store the splits and the plurality of model parameters of the plurality of decision trees within the trained model.

In one embodiment, the system and method further cause the at least one process to compute a gain value of a decision tree based on a difference in an evaluation metric between a parent node and a sum of two child nodes of the parent node, wherein the evaluation metric is determined by the first-order derivative and the second-order derivative of the select loss function; determine that the computed gain value does not satisfy a third element of the second set of parameters; and remove leaf nodes of the decision tree.

In one embodiment, the third element of the second set of parameters is a minimum split loss.

In one embodiment, the first set of numerical parameters is a plurality of weight variables for a plurality of records in the training dataset.

In one embodiment, the second set of numerical parameters is a plurality of hyperparameters including minimum child weight, learning rate, minimum split loss, number of iterations, maximum depth of the decision tree, row sampling, column sampling by tree, and column sampling by split.

In one embodiment, the first element of the second set of numerical parameters is a minimum child weight.

In one embodiment, the second element of the second set of numerical parameters is a learning rate.

In one embodiment, the third set of numerical parameters is a plurality of starting values including a cutoff value for a selected attribute and a predicted value in the first iteration.

In some embodiments, the stopping criteria comprises a maximum number of iterations specified in the second set of numerical parameters, a threshold value indicating no additional gain to be found in a new training iteration, and a threshold value of performance evaluation of the model based on a validation set.

The above described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

The features and advantages of the present invention will be more apparent from the following detailed description taken in conjunction with the accompanying drawings, in which:

FIG. 9 depicts exemplary computer codes for implementing the layered gradient boosting machine algorithm in accordance with one or more illustrative aspects discussed herein.

DETAILED DESCRIPTION

Figure 1:
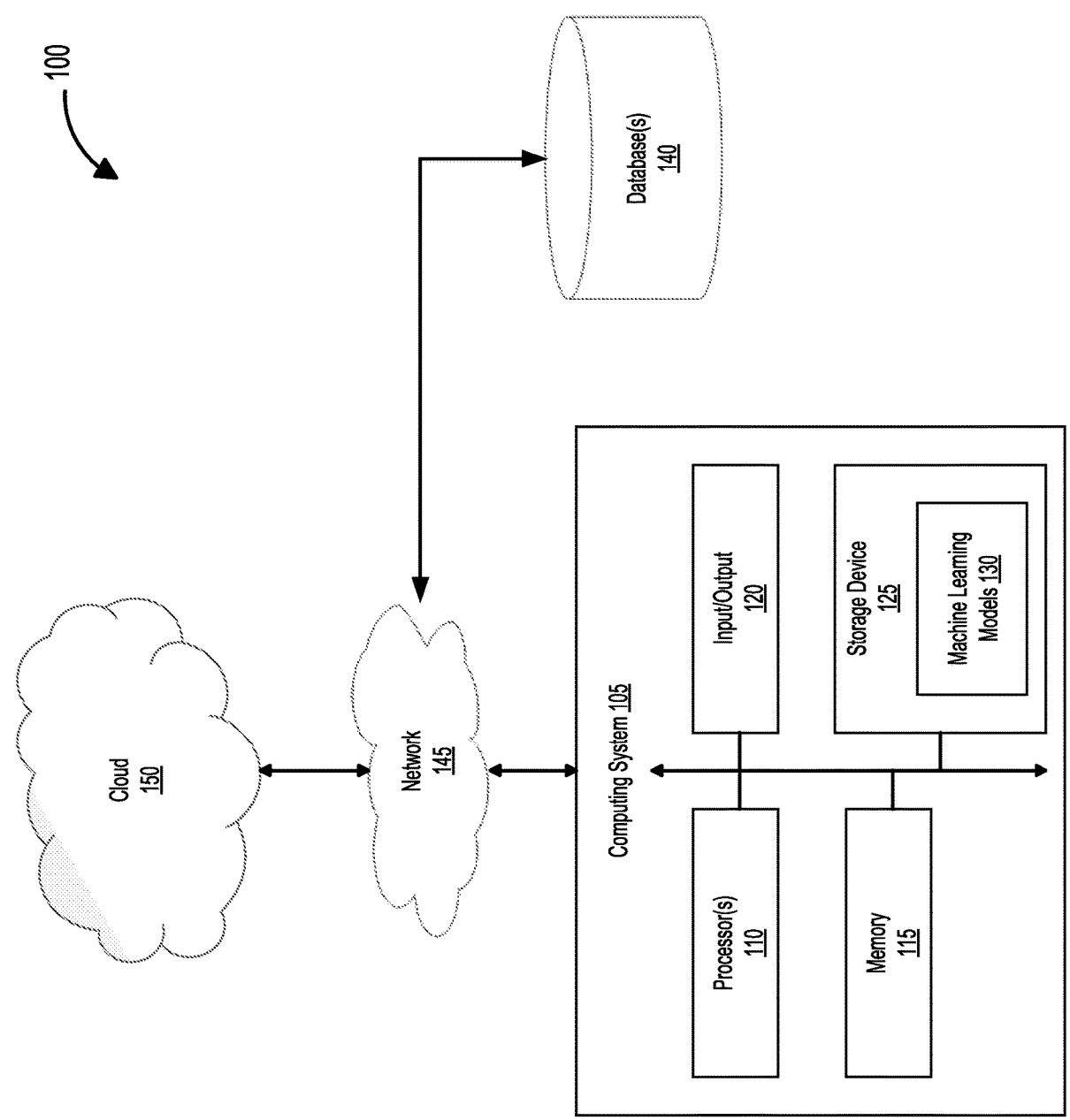
FIG. 1 is an exemplary computing system implementing a layered gradient boosting machine model in accordance with one or more illustrative aspects discussed herein.

By way of introduction, aspects discussed herein relate to a layered gradient boosting machine (LGBM) model for use within the insurance industry, including but not limited to pricing applications, such as auto and homeowner frequency, severity, and pure premium models, and other insurance applications, such as underwriting risk selection based on either profitability or loss cost potential, claims fraud models, and individual reserve development models.

In one embodiment, a non-transitory computer-readable medium is provided having stored thereon computer-readable instructions that when executed by a computing system, cause the computing system to retrieve a training dataset from at least one database; convert records in the training dataset to categorical variables in numeric representation; select weight variables and a set of hyperparameters including minimum child weight, learning rate, minimum split loss, number of iterations, maximum depth of the decision tree, row sampling, column sampling by tree, and column sampling by split; and select a loss function based on a distribution selected from Gaussian (normal) distribution, Poisson distribution, gamma distribution, Tweedie distribution, and logistic distribution.

The exemplary computing system may be configured to initialize a model, for example, an LGBM model, having decision trees with different depths based on the training dataset. The structures of the decision trees with different depths in the first round are determined by the weight variables, the set of hyperparameters, the selected loss function, and starting values.

The exemplary computing system may be used to train the model, based on the training dataset, to refine model parameters of decision trees through multiple iterations, wherein in each iteration, the computing system is configured to compute a first-order derivative and a second-order derivative of the select loss function based on the training dataset, the weight variables, and the prior model parameters of the decision trees; determine splits of the decision trees based on comparison results between the second-order derivative of the selected loss function and minimum child weight in the set of hyperparameters; compute a marginal parameter based on the ratio of the computed first-order derivative and the computed second-order derivative of the selected loss function; update the model parameters of the decision trees with gradient boosting method by adding a product of the marginal parameter and learning rate to the prior model parameters of the decision trees.

The exemplary computing system may stop the training process if the model satisfies at least one of stopping criteria and store the splits and the model parameters of the decision trees within the trained model for future prediction.

The trained model, i.e., the LGBM model, is developed as a transparent and interpretable machine learning model, which can be widely used in various types of insurance, such as health, life, business, residential, and transport. As a predictive model, the LGBM model can be used to price insurance policies, optimize underwriting decisions, analyze customer behaviors, and manage risks. For example, the LGBM model can predict, based on historical data, the expected frequency and severity of insurance claims for personal or commercial auto insurance policies, and determine the premium policy pricing for each policyholder accordingly. In addition, the LGBM model can be used to evaluate the cost of personal or commercial homeowner insurance claims by predicting the expected frequency and severity of the claims, such that the insurers can price their policies more accurately and ensure that they are charging premiums that are appropriate for the level of risk presented by each policyholder.

The LGBM model can also be used to detect fraudulent insurance claims by identifying patterns and anomalies in customer data, which helps insurers prevent and reduce losses due to fraudulent claims.

In one embodiment, the LGBM model can be used to segment customers based on their risk profiles, behaviors, and personal information, allowing insurers to tailor their policies (e.g., retention, conversion, and midterm cancellation) and pricing to different customer groups.

In another embodiment, the LGBM model works as an individual reserve development model that calculates the amount of money reserved for future claims for each policyholder, based on factors such as the policyholder's age, gender, health status, financial status, employment status, and claim history. The LGBM model allows insurers to make more accurate and informed decisions about their reserve levels, which can help them manage their risk more effectively and improve their overall financial performance.

Turning to the drawings, for purposes of illustration, FIG. 1 depicts an exemplary computing system 105 implementing an LGBM model 130 in accordance with one or more embodiments of the disclosure. For example, the computing system 105 is configured to implement the LGBM algorithm by reading and/or executing instructions and performing one or more actions based on the instructions.

The computing system 105 includes one or more processors 110, a memory 115, input/output devices 120, and a storage device 125. The storage device 125 can be an integral component of the computing system 105, as illustrated in FIG. 1, or it can be external to the computing system 105. In addition to an operating system, the storage device 125 includes instructions for implementing one or more machine learning models 130, including an exemplary LGBM model. In at least one embodiment, the computing system 105 may be operatively connected with one or more databases 140 and/or the cloud 150 via a network 145. The computing system 105 may communicate data via network 145 to the one or more databases 140 and/or the cloud 150. It should be understood that the computing components illustrated in FIG. 1 are merely illustrative examples and that in alternate embodiments certain of the computing components can be combined, simplified, or distributed in a different manner.

As described in connection with FIG. 1, some or all of the processing operations described in connection with the foregoing machine learning systems and methods, including the exemplary LGBM model, can be performed by the computing system 105 such as a desktop computer, a laptop, a computer server, a cloud computing system, a mobile device (e.g., a tablet, a smart phone, any other types of mobile computing devices, and the like), and/or any other types of data processing devices. As explained previously, certain operations of the foregoing methods can be performed by a combination of computing systems.

The computing system 105 used in the foregoing exemplary embodiments can include typical components such as one or more processor(s) 110, a memory 115, input/output device 120, and a storage device 125. The components of the computing systems can be interconnected, for example, by a system bus or by communication links. The components of the previously described computing systems are not exhaustive.

The processor(s) 110 can be one or more hardware processors and can execute computer-readable instructions, such as instructions stored in the memory 115. The processor 110 can be an integrated circuit, a central processing unit, a multi-core processing chip, an SoC, a multi-chip module including multiple multi-core processing chips, or other hardware processor in one or more example embodiments. The hardware processor is known by other names, including but not limited to a computer processor, a microprocessor, and a multi-core processor.

The memory 115 can store information including computer-readable instructions and data. The memory 115 can be a cache memory, a main memory, and/or any other suitable type of memory. The memory 115 is a non-transitory computer-readable medium. In some cases, the memory 115 can be a volatile memory device, while in other cases the memory 115 can be a non-volatile memory device.

The storage device 125 can be a non-transitory computer-readable medium that provides large capacity storage for the computing system 105. The storage device 125 can be a disk drive, a flash drive, a solid state device, or some other type of storage device. In some cases, the storage device 125 can be a database that is remote from the computing system. The storage device 125 can store operating system data, file data, database data, algorithms, software modules, and machine learning models 130 as examples.

Figure 2:
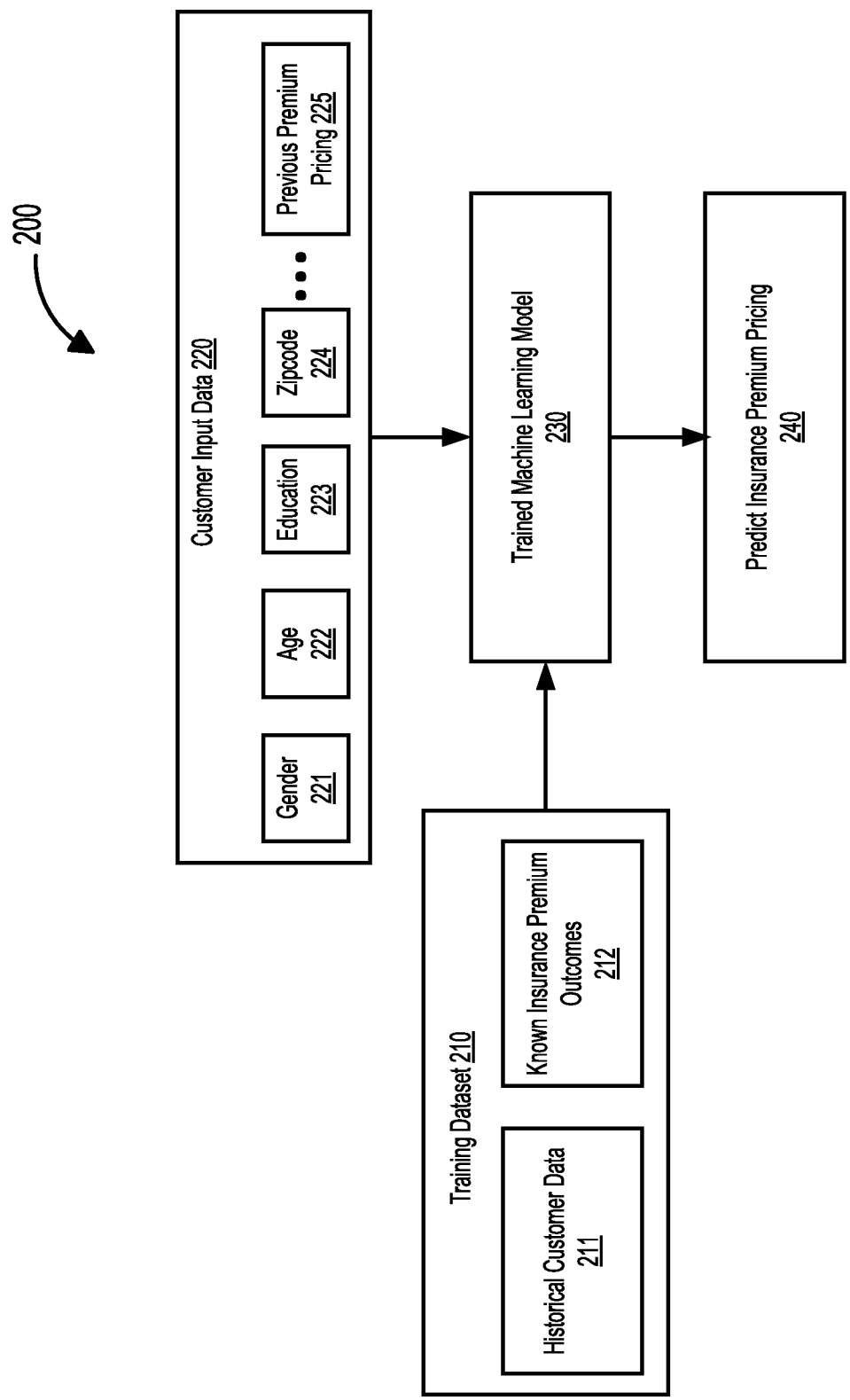
FIG. 2 illustrates an exemplary usage scenario and application of the layered gradient boosting machine model in insurance sector.

Referring to FIG. 2, an exemplary machine learning model 230 is trained and used in insurance sector to predict premium pricing 240 for a customer's insurance policy. In general, a training dataset 210 is used to train or fit the machine learning model 230, such as an exemplary LGBM model. The training dataset 210 is usually a set of observations or data points that comprise historical customer data 211 and known insurance premium outcomes 212. In some embodiments, the historical customer data 211 include attribute variables such as gender, age, education, zip code, and previous premium pricing. These attribute variables are usually categorical or categorical ordered. For example, a continuous variable (e.g., Age) will be represented in user-defined "bands" that are specified as ordered, e.g., <17, 17-18, 18-19, etc. A string attribute variable (e.g., Gender) will be converted to a categorical variable, e.g., "male" to 0, "female" to 1, and "others" to −1. The known insurance premium outcomes 212 are usually numerical response variables. They can be the amount a customer will pay for an insurance policy (i.e., insurance premium) based on the historical customer data 211. For example, for a customer whose historical customer data include gender (e.g., male), age (e.g., 30), education (e.g., graduate), zip code (e.g., 20001), and previous premium pricing (e.g., $600 in 2020), the corresponding known insurance premium outcome for him is $650 in 2021.

When the computing system 105 finishes the training process, the trained machine learning model 230 (e.g., the trained LGBM model) is used to predict insurance premium pricing for a customer based on the customer's input data 220. Like the historical customer data 211, the customer input data 220 include new attribute variables such as gender 221, age 222, education 223, zip code 224, and previous premium pricing 225. The trained machine learning model 230 (e.g., the LGBM model) will output a response based on the customer input data 220. In one embodiment of the present invention, the output response can be a predicted insurance premium pricing 240 (i.e., insurance premium) associated with the customer input data 220.

Figure 3:
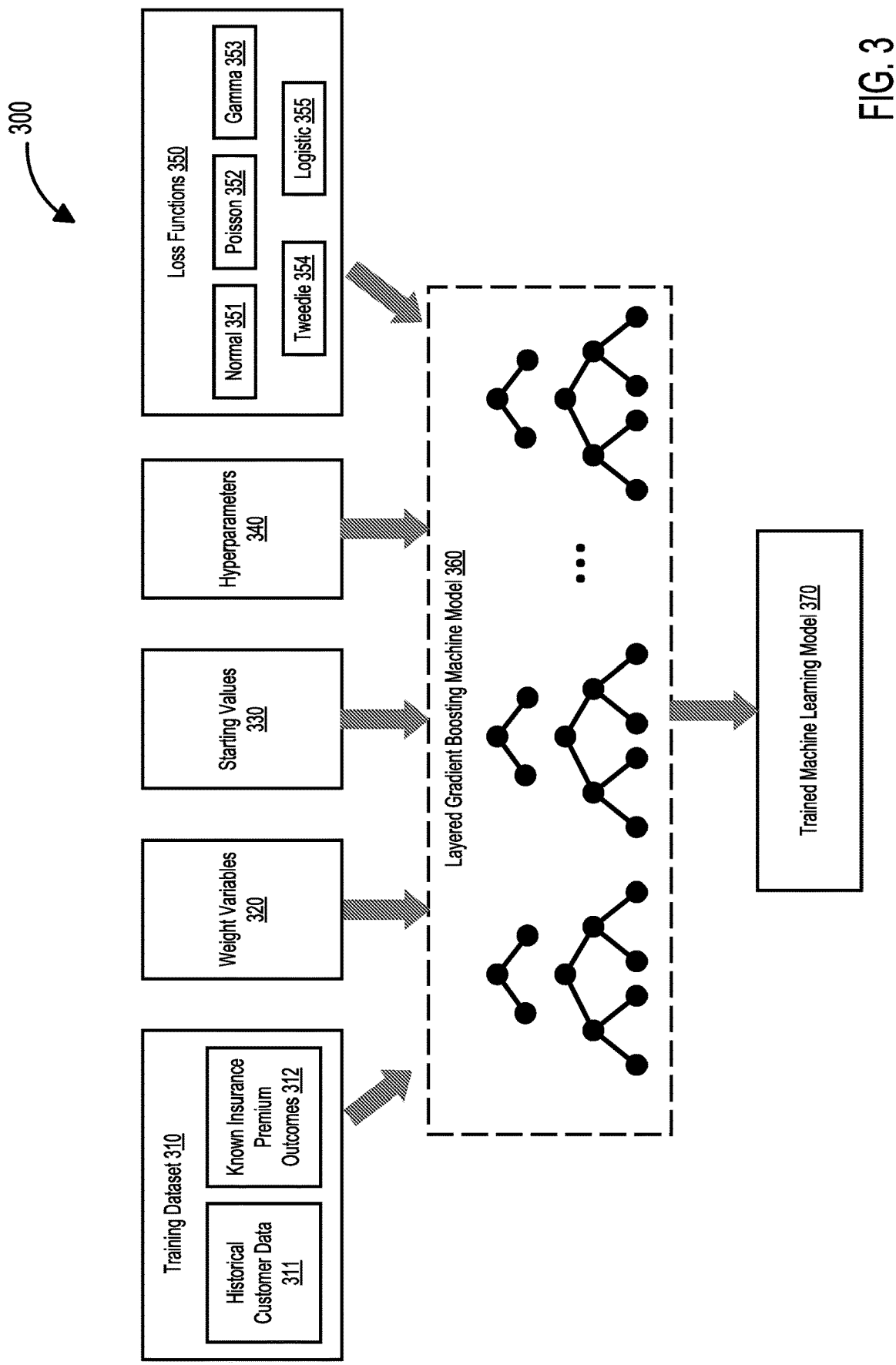
FIG. 3 illustrates an exemplary training process of the layered gradient boosting machine model.

FIG. 3 illustrates an exemplary process 300 for training an LGBM model 360. The inputs to the LGBM model 360 include a training dataset 310, weight variables 320, starting values 330, hyperparameters 340, and a loss function 350. The output is a trained LGBM model 370. The training dataset 310 includes historical customer data 311 and known insurance premium outcomes 312, as described in FIG. 2.

The weight variables 320 are numerical values assigned to the training dataset 310. A weight variable 320 provides a weight for each observation or data point in the training dataset 310. Zero weight variable usually means that the observation or data point is excluded from the analysis since it has no influence in training the LGBM model 360. Observations or data points that have relatively large weight variables have more influences in the analysis than observations or data points that have smaller weights. In one embodiment of the present invention, the weight variable 320 represents "exposure" in insurance sector, which is a measure of the potential risk an insurer faces from their normal business activities. A greater exposure means a higher risk and a higher premium, and therefore is usually assigned with a higher weight variable.

The starting values 330 are used to determine the structure of the LGBM model 360 in the first round or iteration, e.g., splits of the decision trees of the LGBM model 360. For example, the starting values 330 can include the selected attribute variables and corresponding cutoff values that are used to determine the branches or splits of the decision trees in the LGBM model 360. The starting values 330 also include an initial predicted value of observations or data points. In an exemplary embodiment, the starting values 330 use the mean value of the responses (e.g., known insurance premium outcomes 312) as the initial predicted value. The attribute variables and corresponding cutoff values are selected to split data (e.g., training dataset 310) based on some criterion, such as minimizing the prediction errors (i.e., model residuals).

The hyperparameters 340 are a set of numerical parameters used to control the fitting or training process of the LGBM model 360. They usually include learning rate A, number of rounds R, maximum depth D, minimum split loss, minimum child weight, row sampling, column sampling by tree, and column sampling by split.

Learning rate A can be set by different approaches. In one embodiment, a single learning rate A is used for all the depths of the whole LGBM model 360, e.g., $\lambda_1=0.01$, $\lambda_2=0.01$, etc. In an alternative embodiment, each depth of the LGBM model 360 can adopt a customized learning rate. For example, $\lambda_1=0.01$ for depth-1 decision trees, $\lambda_2=0.02$ for depth-2 decision trees, and $\lambda_3$ starts with an initial value 0.2 and decreases to a final value 0.001 with a decay factor of 0.2 for depth-3 decision trees of the LGBM model 360. Therefore, the learning rate $\lambda_3$ is updated for each round in the training process. Assume the learning rate decay function for $\lambda_3$ is given by $$\lambda_3(r)=\max(\lambda_{initial} \times (1-\text{decay\_factor})^{r-1}, \lambda_{final}). \quad (1)$$

Then in round 1(r=1), $\lambda_3=0.2$. In round 2(r=2), $\lambda_3=0.16$, and in round 3(r=3), $\lambda_3=0.128$, etc.

Number of rounds R, also called number of iterations, refers to the number of rounds per depth or layer of the LGBM model 360. If a single number is provided, then this value will be used for each depth or layer of the LGBM model 360. Otherwise, the number of rounds R is formatted as a vector and each element of the vector corresponds to the number of rounds assigned to each depth or layer of the LGBM model 360. For example, if the number of rounds R is set to 10000, then for a 3-layer LGBM model 360, the number of rounds for each depth or layer is 10000. In an alternative embodiment, if the number of rounds R is set to (10000, 5000, 2000) for a 3-layer LGBM model 360, the number of rounds is 10000 for depth-1 decision trees, 5000 for depth-2 decision trees, and 2000 for depth-3 decision trees.

Maximum depth D refers to the number of depths of the LGBM model 360 considered. The maximum depth D is typically set to 3 as it represents the maximum level of complexity that would usually be considered interpretable in exemplary insurance applications. It is not necessary to tune the maximum depth value or set it to a higher value, as the early stopping would kick in as soon as there is no more complexity available in the data. For example, in a typical scenario, there would be no actual signal involving four or more factors that could not be captured with fewer factors (i.e., in earlier depths), so when it goes to the fourth depth, the LGBM model 360 would not fit a significant number of trees.

Minimum split loss and minimum child weight are hyperparameters that control the noise sensitivity of the algorithm. They are used and tuned in the same way as a standard gradient boosting algorithm. Specifically, minimum split loss determines when to trigger a prune operation that removes leaves from the decision tree. Minimum child weight determines whether a split is ignored or not when constructing a decision tree in the LGBM model 360.

Row sampling, column sampling by tree, and column sampling by split are hyperparameters that control how many observations or data points and columns get sampled for inclusion when performing the calculations to construct each tree or split in the LGBM model 360. They are used and tuned in the same way as in a standard gradient boosting algorithm.

Loss functions 350 are differentiated functions used to estimate how good the machine learning model (e.g., the LGBM model 360) is at making predictions with the given input data. In an exemplary embodiment, the loss functions 350 are based on different distributions, including Gaussian (normal) 351, Poisson 352, gamma 353, Tweedie 354, and logistic 355. Loss functions $\mathcal{L}$ and respective first order derivative $\mathcal{L}'$ and second order derivative $\mathcal{L}''$ are listed as follows:

Gaussian (normal) distribution 351:

$$\mathcal{L}=\sqrt{\omega_i(y_i-\xi_i)^2}, \quad (2)$$

$$\mathcal{L}'=-\Sigma\omega_i(y_i-\xi_i), \quad (3)$$

$$\mathcal{L}''=\Sigma\omega_i. \quad (4)$$

Poisson distribution 352:

$$\mathcal{L}=\Sigma\omega_i(-y_i\xi_i+e^{\xi_i}+\ln\Gamma(y_i+1)), \quad (5)$$

$$\mathcal{L}'=-(\Sigma\omega_i y_i-\Sigma\omega_i e^{\xi_i}), \quad (6)$$

$$\mathcal{L}''=\Sigma\omega_i e^{\xi_i}. \quad (7)$$

Gamma distribution 353:

$$\mathcal{L}=\Sigma\omega_i(\xi_i+y_i e^{-\xi_i}), \quad (8)$$

$$\mathcal{L}'=\Sigma\omega_i-\Sigma\omega_i y_i e^{-\xi_i}, \quad (9)$$

$$\mathcal{L}''=\Sigma\omega_i y_i e^{-\xi_i}. \quad (10)$$

Tweedie distribution 354, for variance power P:

$$\alpha=\frac{(2-P)}{(1-P)}, \quad (11)$$

$$\mathcal{L}=-\sum\omega_i(\alpha-1)e^{\frac{\xi_i}{(\alpha-1)}}\left(y_i-\frac{1}{\alpha}e^{\xi_i}\right), \quad (12)$$

$$\mathcal{L}'=-\left(\sum\omega_i y_i e^{\frac{\xi_i}{(\alpha-1)}}-\sum\omega_i e^{\xi_i+\frac{\xi_i}{(\alpha-1)}}\right), \quad (13)$$

$$\mathcal{L}''=\frac{1}{(\alpha-1)}\left(\sum\omega_i y_i e^{\frac{\xi_i}{(\alpha-1)}}-\alpha\sum\omega_i e^{\xi_i+\frac{\xi_i}{(\alpha-1)}}\right). \quad (14)$$

Logistic distribution 355:

$$\mathcal{L} = -\sum \omega_i \left( (2y_i - 1) \frac{e^{\xi_i}}{(e^{\xi_i} + 1)} + (1 - y_i) \frac{e^{\xi_i}}{(e^{\xi_i} + 1)^2} \right), \quad (15)$$

$$\mathcal{L}' = -\left( \sum \omega_i y_i - \sum \frac{\omega_i}{(1 + e^{-\xi_i})} \right), \quad (16)$$

$$\mathcal{L}'' = -\sum \frac{\omega_i}{e^{\xi_i}(1 + e^{-\xi_i})^2}. \quad (17)$$

Herein, $\omega_i$ is a weight variable of the i-th observation or data point; $y_i$ is a response of the i-th observation or data point; and $\xi_i$ is a predicted value of the i-th observation or data point.

Minimum child weight is compared against the calculated $\mathcal{L}''$ " during constructing the LGBM model 360. Any split in which $\mathcal{L}''$ would be less than the minimum child weight for either the left or right child is ignored. For linear regression, this is identical to the sum of the weights, but for other distributions it is not, e.g., for Poisson it is the sum of weighted prior predicted values and for gamma it is the weighted sum of the ratios of the response and prior predicted values. This means that the interpretation of minimum child weight will be different for each tree in the LGBM model 360 as the prior predicted values change.

As illustrated in FIG. 3, the LGBM model 360 uses decision trees as weak learners. The LGBM model 360 uses a depth-1 tree to model a one-way effect, a depth-2 tree to model a two-way interaction, and so on. This provides a flexible model to describe the interaction effects within the decision trees. The decision trees within the LGBM model 360 are fitted or trained via a series of Newton-Raphson (N-R) steps, each of which moves toward reducing the loss function 350. The resultant trained machine learning model 370 is used to predict insurance premium rating or pricing based on customer input data.

Figure 4:
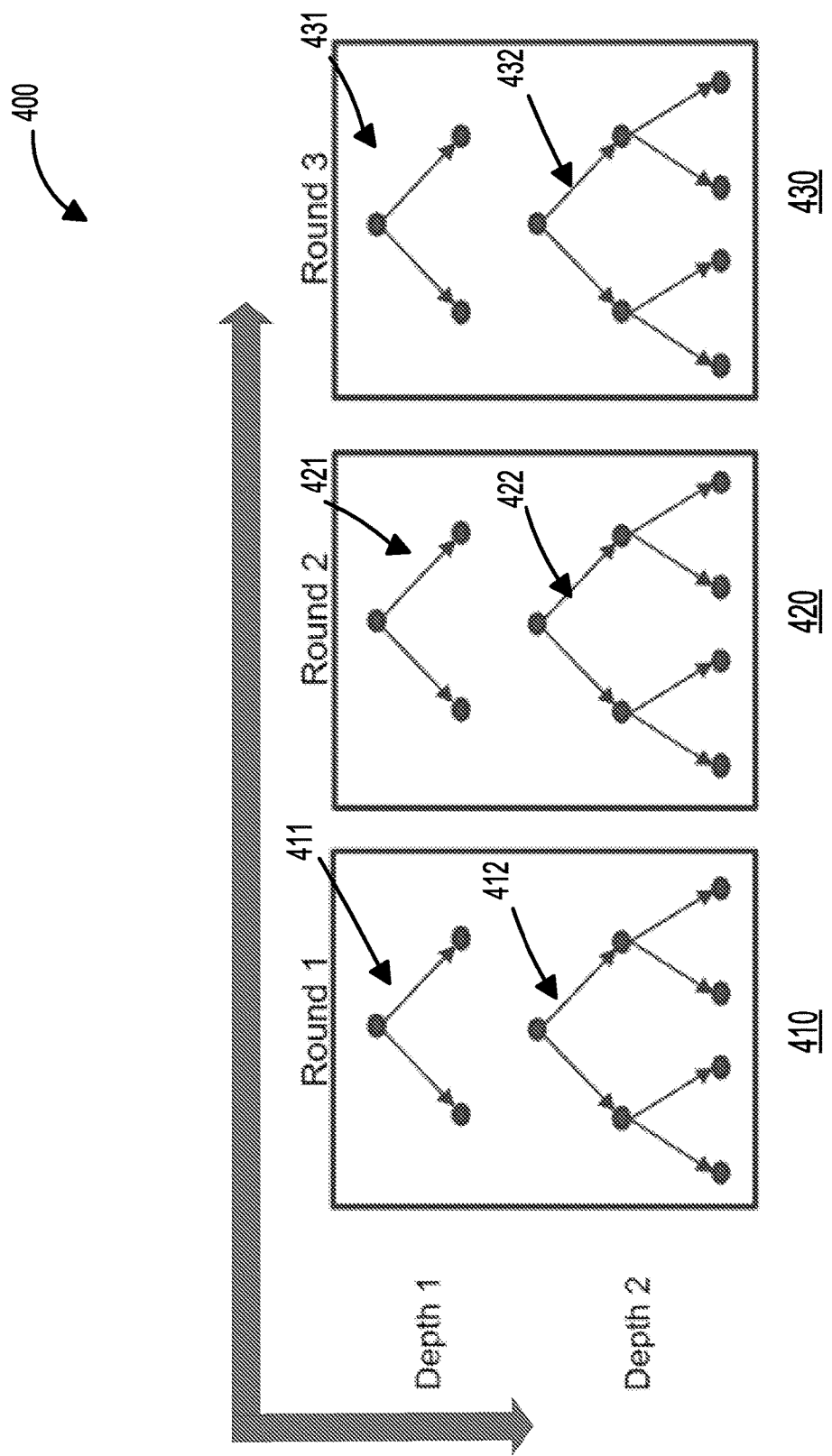
FIG. 4 illustrates an exemplary structure of the layered gradient boosting machine model.

FIG. 4 depicts an exemplary structure of an LGBM model 400 in accordance with one or more embodiments of the disclosure. When determining the structure of a given decision tree in the LGBM model 400, only the predictions from the trees of the previous rounds can be used. For example, to fit a depth-2 tree 432 in round 3, the predicted value of the tree 432 will come from evaluating depth-1 tree 411 in round 1, depth-2 tree 412 in round 1, depth-1 tree 421 in round 2, and depth-2 tree 422 in round 2. In addition, to ensure the two-way interactions are purely interaction effects, and not underlying one-way effects, we require that their effects (leaf values) are fitted after all one-way effects. Therefore, we will evaluate the leaf values of all the depth-1 trees 411, 421, 431 before the depth-2 trees 412, 422, 432.

Figure 5:
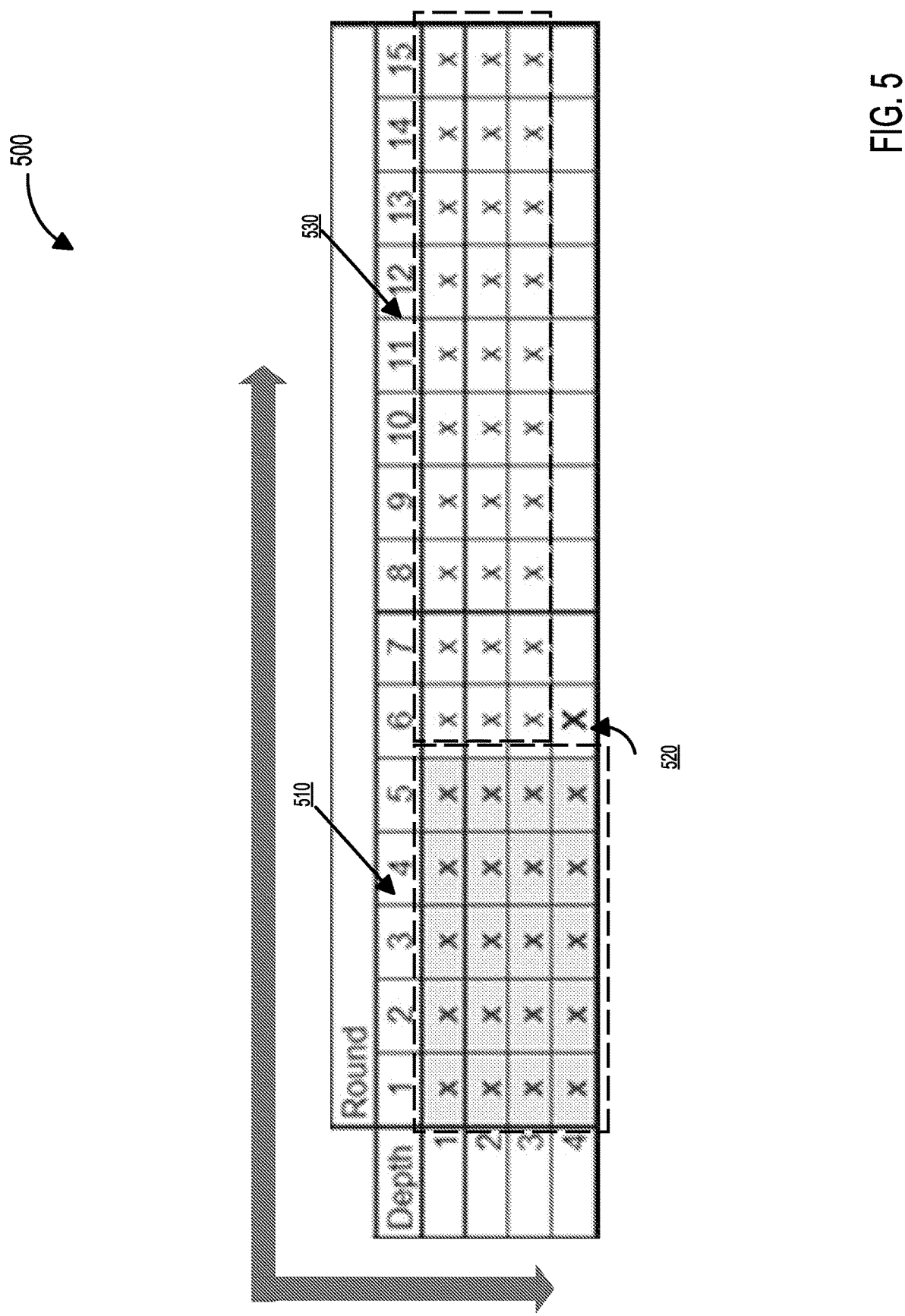
FIG. 5 illustrates another exemplary structure of the layered gradient boosting machine model.

FIG. 5 illustrates an exemplary fitting process for an LGBM model 500 in accordance with one or more embodiments of the disclosure. The LGBM model 500 is made up of four conditional gradient boosting machines (GBMs). The first GBM is of depth-1 and is not conditional on any other GBMs. When fitting the conditional GBM, we have two running sets of predicted values. The first keeps a cumulative evaluation of trees, round by round, for use in fitting the structure (e.g., determining the splits to construct the decision tree). The second set of predicted values also include the predictions from the remaining trees of lower depth. These are used to refit the tree to update predicted values and evaluation metrics that are in-line with all trees in lower depths, or in equal depth in prior rounds. For example, when fitting a depth-4 decision tree 520 in the round 6, only the predicted values of trees 510 from depth-1 to depth-4 in the prior five rounds are used to construct the tree structure (e.g., determining the splits of the tree). Then all the decision trees from depth-1 to depth-4 of all rounds (e.g., 15 rounds) and the decision tree in depth-4 in the prior five rounds are used to refit or update the predicted value of the decision tree 520. In other word, the predicted values of the remaining trees 530 of lower depths and trees 510 from depth-1 to depth-4 in the prior five rounds are used together to update the predicted value of the decision tree 520.

Figure 6:
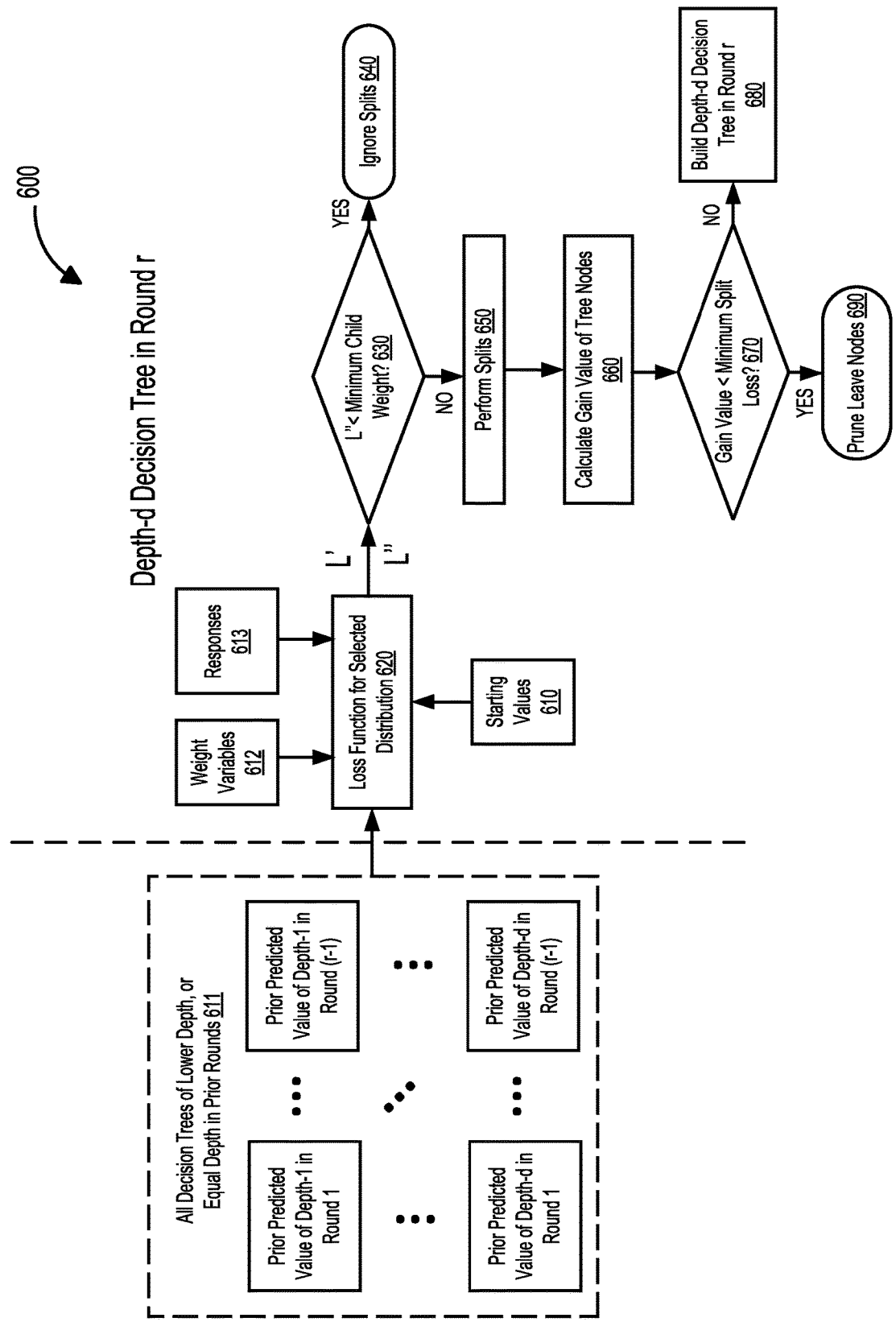
FIG. 6 is a flow chart illustrating an exemplary process to determine the structure of a decision tree of the layered gradient boosting machine model.

FIG. 6 is a flow chart illustrating a depth-d decision tree building process 600 in round r in accordance with one or more embodiments of the disclosure. In round 1, structure of the depth-d decision tree is determined by starting values 610. For example, the starting values 610 can include selected attribute variables and corresponding cutoff values that are used to determine the branches or splits of the decision tree. Alternatively, the starting values 610 can include initial predicted values that can be used, along with weight variables 612 and responses 613, by the computing system 105 to calculate $\mathcal{L}'$ and $\mathcal{L}''$ according to a selected loss function at step 620. $\mathcal{L}''$ is later compared against minimum child weight at step 630 to determine the split of the decision tree in round 1.

In subsequent round r, structure of the depth-d decision tree is determined based on the predicted values of decision trees 611 from depth-1 to depth-d in the prior (r−1) rounds. At step 620, the computing system 105 selects a loss function to calculate $\mathcal{L}'$ and $\mathcal{L}''$ based on starting values 610, predicted values of decision trees 611 from depth-1 to depth-d in the prior (r−1) rounds, weight variables 612, and responses 613. Then the resultant $\mathcal{L}''$ is compared against the minimum child weight at step 630. If $\mathcal{L}''$ is smaller than the minimum child weight of one of the two possible children, the split is ignored at step 640. If not, a split is performed at step 650 to generate a right child node and a left child node.

At step 660, the computing system 105 calculates gain values to determine whether to prune the decision tree. The gain value is defined as the difference between the sum of the evaluation metric for two child nodes compared to the evaluation metric of a parent node. Depending on the distribution, this is an approximation with second order terms of the loss function and constant values left out and may have a different scale from the evaluation metric.

At Step 670, the calculated gain value is compared against a minimum split loss. If the gain value is equal to or larger than the minimum split loss, then the constructed depth-d decision in round r it output at step 680. Otherwise, leaves are recursively pruned away at step 690. This means some nodes with a gain smaller than the minimum split loss survive if they have children with a larger gain (this is possible because there may be an interaction between two variables which identifies a particular cluster of response not sufficiently significant for either variable on its own).

Figure 7:
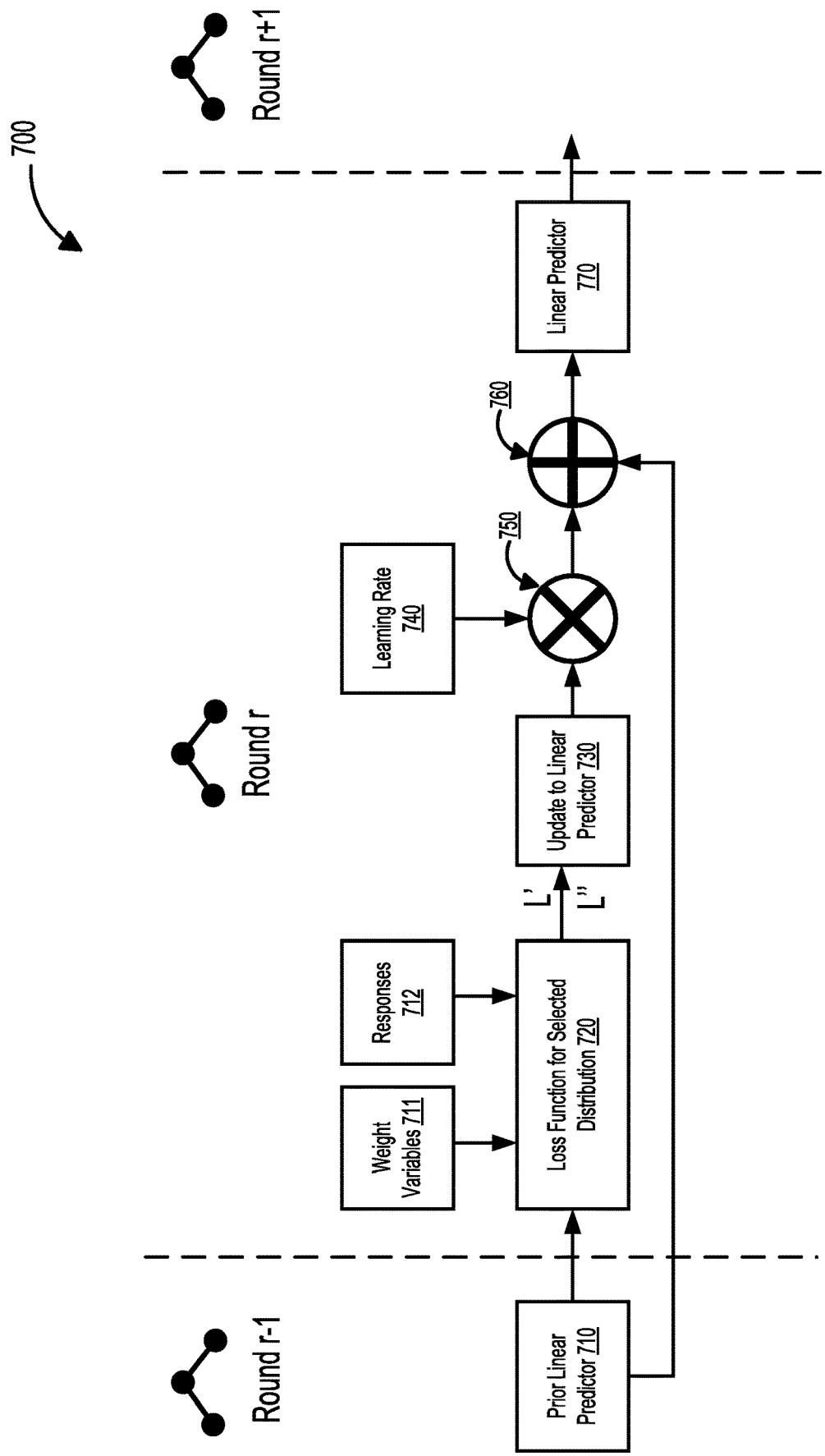
FIG. 7 illustrates an exemplary predictor update process of the layered gradient boosting machine model.

FIG. 7 illustrates an exemplary process 700 for updating predicted values of the LGBM model in accordance with one or more embodiments of the disclosure. A new predicted value is calculated based on response and prior predictions using an approximate maximum likelihood estimate with first-order terms only. Mathematically, the predicted value is calculated to minimize the loss function, which can be written as $$\xi_i = \arg\min_{\xi_i'} \mathcal{L}(y_i, \xi_i'), \tag{18}$$

wherein $y_i$ is the response 712 of the i-th observation or data point and $\xi_i$ is the predicted value 770 of the i-th observation or data point. The predicted values are updated based on all the decision trees from lower depths and the decision trees in the current depth in the prior rounds. For example, in round r, the predicted value $\xi_i^r$ 770 is calculated by updating the prior predicted value $\xi_i^{r-1}$ 710 in the following linear equation:

$$\xi_i^r = \xi_i^{r-1} + \lambda p_i, \tag{19}$$

wherein $\lambda$ is learning rate 740 and $p_i$ is marginal prediction, also called marginal update 730 to the prediction $\xi_i^r$ 770. The marginal prediction $p_i$ is estimated by $\mathcal{L}'$ and $\mathcal{L}''$ as follows:

$$p_i = -\frac{\mathcal{L}'}{\mathcal{L}''}, \tag{20}$$

Herein, $\mathcal{L}'$ and $\mathcal{L}''$ are first-order and second-order derivatives of the selected loss function 720 as defined in equations (2)-(17), respectively, which include cumulative predicted values of all the decision trees from lower depths and the decision trees in the current depth in prior (r−1) rounds. The computing system 105 uses prior predictions 710, weight variables 711, and responses 712 to compute $\mathcal{L}'$ and $\mathcal{L}''$ based on a selected loss function 720. It is to be understood that in round 1(r=1) where the prior predictions 710 are not available, the computing system 105 uses starting values to compute $\mathcal{L}'$ and $\mathcal{L}''$ along with weight variables 711, and responses 712 based on the selected loss function 720. The predicted value 770 is later used as the prior prediction in the next training or fitting round (e.g., round r+1).

In some embodiments, the marginal prediction can be penalized with L1 regularization (Lasso Regression) and L2 regularization (Ridge Regression) with parameters $\ell_1$ and $\ell_2$, respectively. By combining regularization parameters $\ell_1$ and $\ell_2$ together, it becomes the elastic net method. Accordingly, the marginal update 730 (marginal prediction) is given by $$p_i = -\frac{T(\mathcal{L}', \ell_1)}{\mathcal{L}'' + \ell_2}, \tag{21}$$

$$T = \begin{cases} \mathcal{L}' + \ell_1, & \mathcal{L}' < -\ell_1 \\ 0, & -\ell_1 \le \mathcal{L}' \le \ell_1 \\ \mathcal{L}' - \ell_1, & \mathcal{L}' > \ell_1 \end{cases} \tag{22}$$

Figure 8:
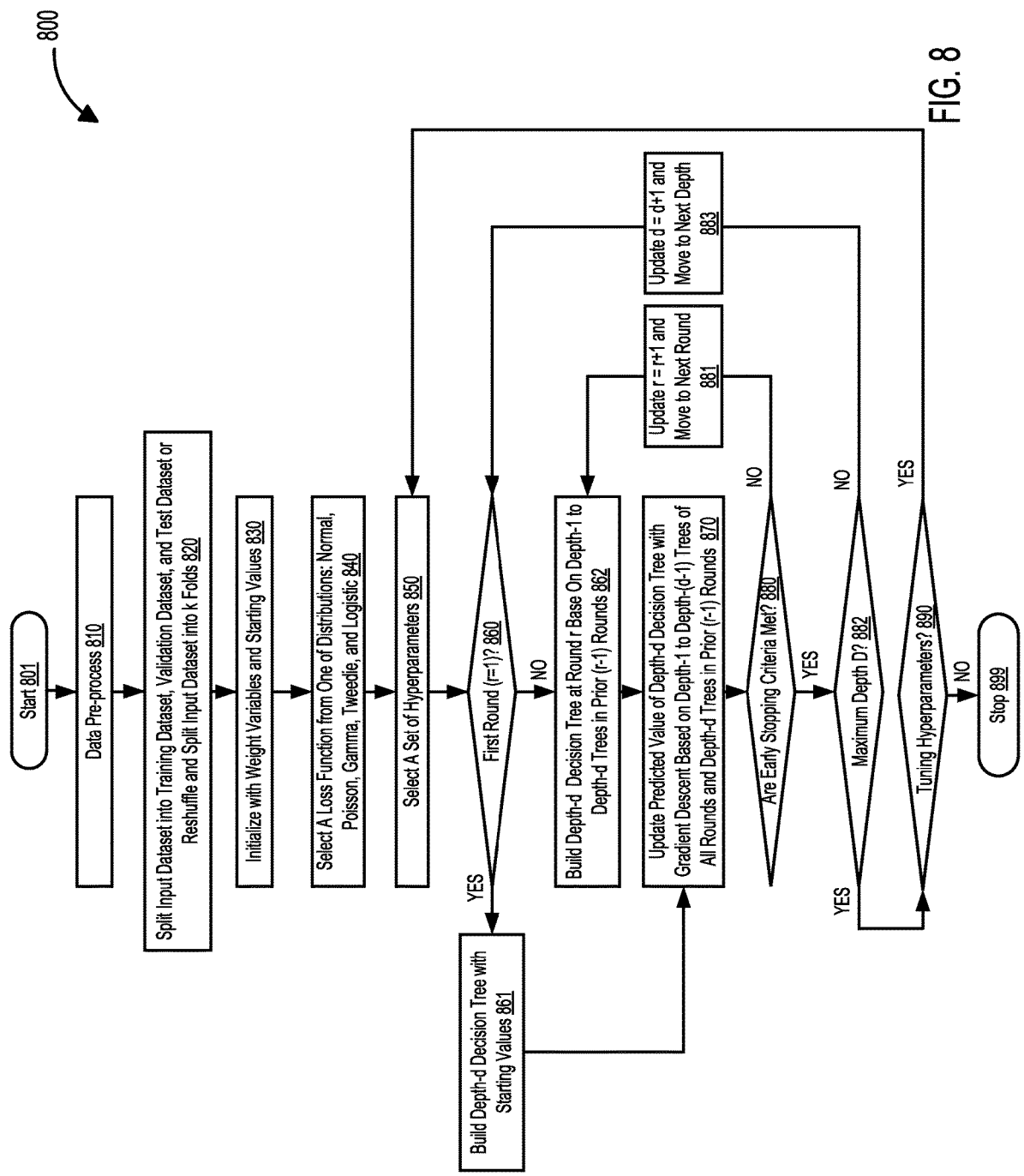
FIG. 8 is a flow chart illustrating an exemplary process to train the layered gradient boosting machine model.

FIG. 8 is a flow chart illustrating an exemplary process 800 for training an LGBM model in accordance with one or more embodiments of the disclosure. The process 800 includes example operations that may be implemented by a suitable computing system, as described further herein. For example, the process 800 may be implemented by the computing system illustrated in FIG. 1. It should be understood that although some of the operational flows are presented in sequence, some operations may be performed in parallel, and/or in other orders than those that are illustrated. For example, steps 820, 830, 840, 850 can be performed in parallel. Referring to FIG. 8, the process 800 starts from step 801 and proceeds to step 810.

At step 810, the computing system 105 receives and pre-processes input data. As illustrated in FIG. 1, the computing system 105 can retrieve the input data from one or more databases 140 and/or the cloud 150 via a network 145. In another example, the computing system 105 can receive input data directly from input/output devices 120. The input data usually include attribute variables, numerical response variables, numerical weight variables, and numerical starting values. The computing system 105 must pre-process the input data to ensure they are generally "clean" and are in a single table. The pre-processing can include filling in missing values, joining claims and policy dataset together, "episoding" of the observations or data points (e.g., creating two observations, one for each year it crosses over), etc. In particular, a banding process must be performed on the attribute variables, which involves assigning a "ruleset" which converts a raw data field into a categorical level. In the case of numeric variables, an order is assigned to the categorical level. For example, for a numeric variable with values 0.1, 1.2, 5.4 etc., these values can be categorized as "<1", "1-5" and "5+" and specify that order. A continuous variable (e.g., Age) can be represented in user-defined "bands" that are specified as ordered, e.g., <17, 17-18, 18-19, etc. A string attribute variable (e.g., Gender) will be converted to a categorical variable, e.g., "male" to 0, "female" to 1, and "others" to −1.

At step 820, the attribute variables and numerical response variables are further divided into training dataset, validation dataset, and test dataset. The training dataset is used to train the LGBM model. The validation dataset is used to evaluate the trained LGBM model while tuning model hyperparameters. The test dataset is used to provide an unbiased evaluation of the final LGBM model once it is completely trained on the training dataset and validation dataset.

Alternatively, k-fold cross validation can be applied to evaluate the LGBM model on limited data samples, wherein k is an integer numerical value, such as 5 and 10. Specifically, the attribute variables and corresponding numerical response variables are reshuffled randomly and then divided into k groups, or folds, of approximately equal size. By choosing each unique group or fold as the test dataset and the remaining k−1 groups or folds as the training datasets, LGBM model will be fitted k times on different training datasets and be evaluated k times on different test datasets. The results of a k-fold cross validation often include mean and variance of the evaluation metrics.

At step 830, the computing system 105 initializes weight variables and starting values from the input data. Each observation or data point is associated with a weight value. During training, a training data point with a higher weight value matters more, due to its larger effect on loss function. In one embodiment of the present invention, the weight value represents "exposure" in insurance, which is a measure of the potential risk an insurer faces from their normal business activities. A greater exposure means a higher risk and a higher premium, and therefore is usually assigned with a larger weight value. The starting values are used to determine the structure of the LGBM model in the first round or iteration. They can include selected attribute variables and corresponding cutoff values that are used to determine the branches or splits of the decision trees in the LGBM model. Alternatively, the starting values can be initial predicted values.

At step 840, the computing system 105 select a loss function $\mathcal{L}$ from one of the distributions: Gaussian (normal), Poisson, gamma, Tweedie, and logistic. Accordingly, the loss function $\mathcal{L}$, its first-order derivative $\mathcal{L}'$, and second-order derivative $\mathcal{L}''$ are given in equations (2)-(17).

At step 850, the computing system 105 selects a set of hyperparameters used in the training process 800. The hyperparameters usually include learning rate A, number of rounds R, maximum depth D, minimum split loss, minimum child weight, row sampling, column sampling by tree, and column sampling by split. The computing system 105 can tune the values of hyperparameters to find the optimal ones by iteratively training and evaluating the LGBM model by using training dataset and validation dataset. Illustrative pseudocode corresponding to an implementation of this step may be found in lines 1 and 23 of FIG. 9.

At step 860, the computing system 105 starts to iteratively construct and fit decision trees in the LGBM model. For each depth or layer of the LGBM model, the computing system 105 will first check if the training process 800 is in first round. If yes, the training process 800 proceeds to step 861. Otherwise, the training process 800 proceeds to step 862. Illustrative pseudocode corresponding to an implementation of this step may be found in lines 2-4 of FIG. 9.

At step 861, the computing system 105 constructs a decision tree in the first round by using the starting values. The predicted values are calculated to approximately minimize the loss function in the first round. The starting values are initial predicted values $\xi_i^{(0,0)}$, which can be the average of responses $y_i$. Illustrative pseudocode corresponding to an implementation of this step may be found in line 5 of FIG. 9.

At step 862, the computing system 105 constructs a decision tree based on predicted values of decision trees in equal or lower depths in prior rounds. For example, structure of a depth-d decision tree in round r is determined by the cumulative predicted values of depth-1 to depth-d decision trees in prior (r−1) rounds. It would not use predicted values of decision trees in lower depth in or after round r. Illustrative pseudocode corresponding to an implementation of this step may be found in lines 7-8 of FIG. 9.

At step 870, the computing system 105 updates predicted value of the decision tree with gradient descent approach. Specifically, the computing system 105 will keep the splits of the newly fitted tree but throw away the leaf values. It calculates the predicted values or the new leaf values of the decision tree via a series of Newton-Raphson steps. The predicted value of the decision tree is updated based on all the decision trees in lower depths and decision trees in the current depth in prior rounds. For example, the predicted value of a depth-d decision tree in round r is updated by using gradient descent approach, based on predicted values of all the decision trees from depth-1 to depth-(d−1) and the depth-d decision trees in prior (r−1) rounds. The update process is expressed as $$\xi_i^{(r,d)} = \xi_i^{(r-1,d)} + \lambda p_i, \quad (23)$$

wherein $\lambda$ is a learning rate and $p_i$ is a marginal prediction (also called marginal update) to the predicted value $\xi_i^{(r,d)}$ which is estimated by $$p_i = -\frac{\mathcal{L}'}{\mathcal{L}''}.$$

$\mathcal{L}'$ is the first-order derivative of the loss function $\mathcal{L}$ and $\mathcal{L}''$ is the second-order derivative of the loss function $\mathcal{L}$, which are defined in equations (2)-(17) that include cumulative predicted values of all the decision trees in lower depths and the decision trees in the current depth in prior rounds. Illustrative pseudocode corresponding to an implementation of this step may be found in lines 10-13 of FIG. 9.

At step 880, a determination is made concerning whether or not any of the early stopping criteria is satisfied. If yes, the training process proceeds to step 882. Otherwise, the training process 800 proceeds to step 881 to update r=r+1. Then training process 800 will return to step 862 for next training round. The stopping criteria can be the number of rounds R set in the set of hyperparameters, a threshold value that indicates there is no additional gain to be found, and/or a threshold value of performance evaluation of the model based on a validation set. Illustrative pseudocode corresponding to an implementation of this step may be found in lines 17-19 of FIG. 9.

At step 882, the computing system 105 further compares the current depth of decision tree against the maximum depth D. If the depth of decision tree reaches the maximum depth D, the training process 800 stops and proceeds to step 890. Otherwise, the training process 800 proceeds to step 883 to update d=d+1. Then training process 800 will return to step 860 for training decision tree of next depth. Illustrative pseudocode corresponding to an implementation of this step may be found in lines 14-16 of FIG. 9.

At step 890, the computing system 105 can determine whether to tune the hyperparameters. If yes, a new set of hyperparameters is applied to train the LGBM model and the training process 800 returns to step 850 for a new training. Otherwise, the computing system 105 stores and output the trained LGBM model and the process 800 terminates at step 899. Illustrative pseudocode corresponding to an implementation of this step may be found in lines 1, 23-24 of FIG. 9.

The computer-readable instructions can be referred to as computer programs, programs, software applications, applications, scripts, computer language scripts, or code. They can be implemented in a high-level procedural and/or objective-oriented programming language, and/or in assembly/machine language.

Other examples and implementations are within the scope and spirit of the disclosure and appended claims. The subject matter described herein can be embodied in systems, apparatus, methods, non-transitory computer readable medium, and/or articles depending on the desired configuration. The foregoing description presents numerous specific details and uses specific nomenclature in order to provide the reader with an understanding of various embodiments. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A system, comprising:
at least one processor;
at least one database configured to store a training dataset comprising a plurality of records, wherein each of the plurality of records includes one or more attribute variables associated with historical customer data and a response variable representing a known insurance premium outcome;
at least one memory storing instructions that, when executed by the at least one processor, cause the at least one processor to:
retrieve the training dataset from the at least one database;
convert the plurality of records in the training dataset to categorical variables in numeric representation;
select a first set of numerical parameters and a second set of numerical parameters;
select a loss function based on a probability distribution;
initialize a model having a plurality of decision trees with different depths, based on the training dataset, the first set of numerical parameters, the second set of numerical parameters, the selected loss function, and a third set of numerical parameters, to compute a plurality of model parameters;
train the model, based on the training dataset, to refine a plurality of model parameters of the plurality of decision trees through a plurality of iterations, wherein in each iteration, the instructions cause the at least one processor to:
compute a first-order derivative of the selected loss function and a second-order derivative of the selected loss function based on the training dataset, the first set of numerical parameters, and a first set of model parameters of decision trees in equal or lower depths in prior iterations;
determine splits of the plurality of decision trees based on comparison results between the second-order derivative of the selected loss function and a first element of the second set of numerical parameters;
compute a marginal parameter based on the ratio of the computed first-order derivative of the selected loss function and the computed second-order derivative of the selected loss function;
update the model parameters of the plurality of decision trees with a product of the marginal parameter and a second element of the second set of numerical parameters based on a second set of model parameters of decision trees in lower depths of all iterations and in the equal depth in prior iterations;
determine that the trained model, after training through the plurality of iterations, satisfies at least one of stopping criteria; and
store the splits and the plurality of model parameters of the plurality of decision trees within the trained model.

2. The system of claim 1, wherein the instructions further cause the at least one processor to:
compute a gain value of one of the decision trees based on a difference in an evaluation metric between a parent node and a sum of two child nodes of the parent node, wherein the evaluation metric is determined by the first-order derivative of the selected loss function and the second-order derivative of the selected loss function;
determine the computed gain value does not satisfy a third element of the second set of parameters; and
remove each leaf node of the one of the decision trees.

3. The system of claim 2, wherein the third element of the second set of parameters is a minimum split loss.

4. The system of claim 1, wherein the first set of numerical parameters is a plurality of weight variables for a plurality of records in the training dataset.

5. The system of claim 1, wherein the second set of numerical parameters is a plurality of hyperparameters including minimum child weight, learning rate, minimum split loss, number of iterations, maximum depth of the decision tree, row sampling, column sampling by tree, and column sampling by split.

6. The system of claim 1, wherein the first element of the second set of numerical parameters is a minimum child weight.

7. The system of claim 1, wherein the second element of the second set of numerical parameters is a learning rate.

8. The system of claim 1, wherein the probability distribution is one of Gaussian (normal) distribution, Poisson distribution, gamma distribution, Tweedie distribution, and logistic distribution.

9. The system of claim 1, wherein the third set of numerical parameters is a plurality of starting values including a cutoff value for a selected attribute and a predicted value in the first iteration.

10. The system of claim 1, wherein the stopping criteria comprises a maximum number of iterations specified in the second set of numerical parameters, a threshold value indicating no additional gain to be found in a new training iteration, and a threshold value of performance evaluation of the model based on a validation set.

11. The system of claim 1, wherein the model is configured to generate predictions of at least one of insurance premium policies, claim cost, claim frequency, and claim severity, based on customer input data.

12. A method, comprising:
retrieving a training dataset from at least one database;
converting a plurality of records in the training dataset to categorical variables in numeric representation, wherein each of the plurality of records includes one or more attribute variables associated with historical customer data and a response variable representing a known insurance premium outcome;
selecting a first set of numerical parameters and a second set of numerical parameters;
selecting a loss function based on a probability distribution;
initializing a model having a plurality of decision trees with different depths, based on the training dataset, the first set of numerical parameters, the second set of numerical parameters, the selected loss function, and a third set of numerical parameters, to compute a plurality of model parameters;
training the model, based on the training dataset, to refine a plurality of model parameters of the plurality of decision trees through a plurality of iterations, wherein each iteration comprises:
computing a first-order derivative of the selected loss function and a second-order derivative of the selected loss function based on the training dataset, the first set of numerical parameters, and a first set of model parameters of decision trees in equal or lower depths in prior iterations;

determining splits of the plurality of decision trees based on comparison results between the second-order derivative of the selected loss function and a first element of the second set of numerical parameters;

computing a marginal parameter based on the ratio of the computed first-order derivative of the selected loss function and the computed second-order derivative of the selected loss function;

updating the model parameters of the plurality of decision trees with a product of the marginal parameter and a second element of the second set of numerical parameters based on a second set of model parameters of decision trees in lower depths of all iterations and in the equal depth in prior iterations;

determining that the trained model, after training through the plurality of iterations, satisfies at least one of stopping criteria; and storing the splits and the plurality of model parameters of the plurality of decision trees within the trained model.

13. The method of claim 12, further comprises:

computing a gain value of one of the decision trees based on a difference in an evaluation metric between a parent node and a sum of two child nodes of the parent node, wherein the evaluation metric is determined by the first-order derivative of the selected loss function and the second-order derivative of the selected loss function;

determining the computed gain value does not satisfy a third element of the second set of parameters; and remove each leaf node of the one of the decision trees.

14. The method of claim 13, wherein the third element of the second set of parameters is a minimum split loss.

15. The method of claim 12, wherein the first set of numerical parameters is a plurality of weight variables for a plurality of records in the training dataset.

16. The method of claim 12, wherein the second set of numerical parameters is a plurality of hyperparameters including minimum child weight, learning rate, minimum split loss, number of iterations, maximum depth of the decision tree, row sampling, column sampling by tree, and column sampling by split.

17. The method of claim 12, wherein the first element of the second set of numerical parameter is a minimum child weigh.

18. The method of claim 12, wherein the second element of the second set of numerical parameters is a learning rate.

19. The method of claim 12, wherein the probability distribution is one of Gaussian (normal) distribution, Poisson distribution, gamma distribution, Tweedie distribution, and logistic distribution.

20. The method of claim 12, wherein the third set of numerical parameters are starting values including a cutoff value for a selected attribute and a predicted value in the first iteration.

21. The method of claim 12, wherein the stopping criteria comprises a maximum number of iterations specified in the second set of numerical parameters, a threshold value indicating no additional gain to be found in a new training iteration, and a threshold value of performance evaluation of the model based on a validation set.

22. The method of claim 12, wherein the model is configured to generate predictions of at least one of insurance premium policies, claim cost, claim frequency, and claim severity, based on customer input data.

23. A non-transitory computer-readable medium including processor-executable instructions for generating a layered machine learning model to process data to predict at least one of insurance premium policies, claim cost, claim frequency, and claim severity, when executed by a processor, cause the processor to perform the steps of:

retrieving a training dataset from at least one database;

converting a plurality of records in the training dataset to categorical variables in numeric representation, wherein each of the plurality of records includes one or more attribute variables associated with historical customer data and a response variable representing a known insurance premium outcome;

selecting a plurality of weight variables for the plurality of records in the training dataset and a plurality of hyperparameters including minimum child weight, learning rate, minimum split loss, number of iterations, maximum depth of the decision tree, row sampling, column sampling by tree, and column sampling by split;

selecting a loss function based on one of Gaussian (normal) distribution, Poisson distribution, gamma distribution, Tweedie distribution, and logistic distribution;

initializing a model having a plurality of decision trees with different depths, based on the training dataset, the weight variables, the plurality of hyperparameters, the selected loss function, and a plurality of starting values including a cutoff value for a selected attribute and a predicted value in the first iteration, to compute a plurality of model parameters;

training the model, based on the training dataset, to refine a plurality of model parameters of the plurality of decision trees through a plurality of iterations, wherein each iteration comprises:

computing a first-order derivative of the selected loss function and a second-order derivative of the selected loss function based on the training dataset, the weight variables, and a first set of model parameters of decision trees in equal or lower depths in prior iterations;

determining splits of the plurality of decision trees based on comparison results between the second-order derivative of the selected loss function and a minimum child weight;

computing a marginal parameter based on the ratio of the computed first-order derivative of the selected loss function and the computed second-order derivative of the selected loss function;

updating the model parameters of the plurality of decision trees with a product of the marginal parameter and a learning rate based on a second set of model parameters of decision trees in lower depths of all iterations and in the equal depth in prior iterations;

determining that the trained model, after training through the plurality of iterations, satisfies at least one of stopping criteria, including a maximum number of iterations specified in the second set of numerical parameters, a threshold value indicating no additional gain to be found in a new training iteration, and a threshold value of performance evaluation of the model based on a validation set; and storing the splits and the plurality of model parameters of the plurality of decision trees within the trained model.

* * * * *